United States Patent Office 3,463,773
Patented Aug. 26, 1969

3,463,773
CELLULOSE ESTER MOLDED PRODUCTS AND METHODS OF MANUFACTURING SAME
Robert F. Williams, Jr., and George P. Calloway, Jr., Rochester, N.Y., assignors to Eastman Kodak Company, New York, N.Y., a corporation of New Jersey
Continuation of application Ser. No. 522,641, Jan. 24, 1966, which is a continuation-in-part of applications Ser. No. 159,235, Dec. 14, 1961, and Ser. No. 213,503, July 30, 1962. This application July 18, 1967, Ser. No. 654,276
Int. Cl. B29c 25/00
U.S. Cl. 260—227                           15 Claims

ABSTRACT OF THE DISCLOSURE

Molding certain cellulose triesters in a carefully controlled manner in order to make the molded articles crystalline in nature has been found to substantially increase the heat distortion temperature of the molded products. Both the identity of the cellulosic raw material and the manufacturing process are critical elements in the successful practice of this invention. The claimed processes involve holding the article for a period of time (after it is formed) at a temperature approaching, but nevertheless below, the melting point of the cellulosic material.

---

This application is a continuation-in-part of our copending applications Ser. No. 159,235, now abandoned, filed Dec. 14, 1961, and Ser. No. 213,503, now abandoned filed July 30, 1962 a continuation of copending application 522,641 filed Jan. 24, 1966, now abandoned.

This invention relates to a method of preparing molded products of cellulose esters characterized by exceptionally good thermal properties, and to the molded parts thus obtained.

Molded products manufactured from the cellulose esters which have been most popular for use in thermoplastic molding compositions have had a predominantly amorphous molecular structure and have exhibited poor resistance to distortion when heated at moderate temperatures, as well as poor dimensional stability and insufficient toughness. These drawbacks have prevented their use for many articles which are subject to large temperature variations.

One object of our invention is to provide a method of preparing molded products of cellulose esters having good crystallinity and resultant improved physical properties, especially improved resistance to heat distortion. Another object of our invention is to provide molded products of specific cellulose esters characterized by high distortion temperatures.

Other objects are to provide a novel method for preparing molded products of crystalline cellulose esters by introducing a flowable melt into a mold; and to provide such a method for molding sheets of crystalline cellulose ester compositions by drawing them into or over a mold to form cups or the like.

Still another object is to provide such a method whereby crystalline cellulose ester articles can be molded with a short time cycle to permit a rapid rate of production.

In its generic aspects our invention involves shaping a flowable mass of amorphous cellulose ester material, as by introducing it into a heated mold and causing it to assume the shape of the mold or by extrusion molding it, while concurrently and continuously holding the cellulose ester at a temperature above the spontaneous crystallization temperature but below the crystalline melting point long enough so as to induce crystallinity while the shaped article hardens. For example, the mold temperature should be between 180° and 360° F. (82–182° C.) for articles directly injection molded from a flowable melt in one step; above 300° F. (149° C.) for thin sheet.

After hardening (which usually requires only a few seconds in the mold) the shaped article is ejected from the mold, after which the cycle is repeated. The ejected article is ready for further finishing operations directly. However, if even more greatly improved characteristics are desired, the shaped article is introduced into a hot bath of liquid, such as oil, which is maintained at a temperature of 100–150° C., where it is retained for the optimum period of time, such as up to twenty minutes, before removal and subsequent finishing operations.

With articles cast in one step from a melt and cooled in a heated mold, we have found that by using a molding composition of specific cellulose esters of compositions described below, and casting in a mold whose temperature is so maintained that the heat transferral rate from the center of the molded piece is less than 100 calories per second per gram, the molded products have good crystallinity and heat distortion temperatures above 160° C., more generally above 180° C., together with other desirable characteristics such as good dimensional stability and good toughness.

The compositions which are useful in accordance with our invention are the substantially fully esterified cellulose esters, in which at least ⅓ of the combined acyl is fatty acid radicals having 3 to 4 carbon atoms, which esters contain not more than .6% hydroxyl and preferably less than 0.2% hydroxyl, and have an intrinsic viscosity of over 1, both before and after heating for one-half hour at 250° C., in methylene chloride-methyl alcohol solution (9:1). For this intrinsic viscosity, the combined sulfur content of the ester should be less than .01%. In the case of mixed esters, 95% of the acyl groups therein should be the acyls which do not differ from each other by more than 1 carbon atom. Thus, esters useful in our invention include cellulose tripropionate, cellulose tributyrate, cellulose acetate propionate having no more than 31% acetyl content (at least 16% propionyl) and cellulose propionate butyrate.

Examples of useful cellulose esters are those prepared by the procedure described in U.S. Patent 3,047,461 or those prepared by esterification procedures in which zinc chloride or some other non-combining (non-sulfur imparting) catalyst such as methane trisulfonic acid or the like is employed. It is of course understood that the cellulose ester as it is prepared is not subjected to sufficient hydrolysis to increase its hydroxyl content beyond that specified herein. Esters which have the intrinsic viscosity prescribed herein are those prepared as described and preferably stabilized by a stabilization treatment such as disclosed in U.S. Patents Nos. 2,899,316 of Rouse and Hill, 2,899,315 of Williams and Lowe or a similar stabilization procedure.

Molding compositions for our invention may, if desired, be homogeneously mixed with a suitable plasticizing material in an amount up to 25%, based on the cellulose ester. The plasticizers which may be used are those which have a linear chain of at least 5 carbon atoms. Some plasticizers representative of those having a linear chain of at least 5 carbon atoms are butyl stearate, dibutyl sebacate, dioctyl phthalate, methoxyethyl palmitate, diisobutyl azelate and the like. Other materials which do not affect the product adversely or do not sweat out of the molded piece also may be incorporated. For instance, paraffin wax may be incorporated in an amount up to 1%, it being characteristic of our invention that this material can be incorporated in a cellulose ester molding composition and molded without exuding from the molded product.

Referring to the drawings.

DIRECT MOLDING OF CRYSTALLINE ARTICLES FROM MELT

Figure 1:
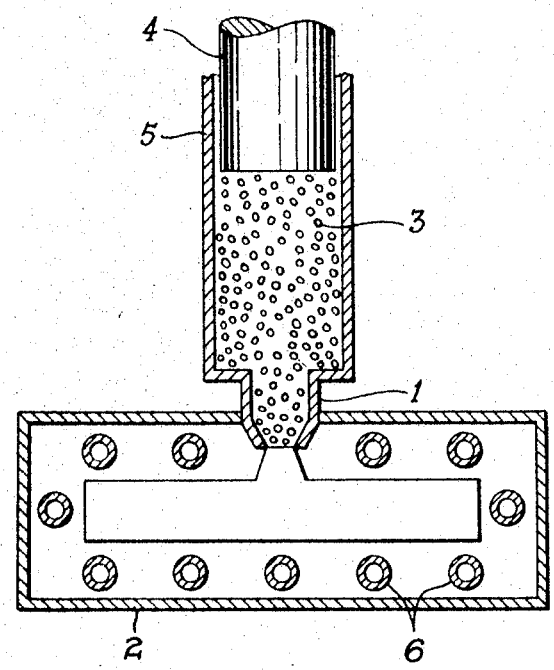
FIG. 1 is a schematic vertical sectional view, parts being in elevation, showing an injection molding apparatus for molding relatively massive products in accordance with our invention.

Referring to FIG. 1, an injection molding device comprises a cylinder 5 within which a piston 4 operates upon composition 3, forcing the material through nozzle 1 whereby a slug of the molding composition is injected into and fills the interior of a mold 2 equipped with heating tubes 6. In the molding operation, the cylinder is filled with the cellulose ester molding material described above in the form of granules or pellets, which material is heated by a surrounding electrical heater or the like to a temperature above the melting point, e.g. 400–500° F. (204–260° C.) so as to be changed into a flowable mass. The down thrust of piston 4 forces the hot flowable plastic through nozzle 7 into the mold 2 which, in the operation of our invention, is concurrently and continuously maintained at a temperature within the range of 180° to 360° F. (82–182° C.) by means of the surrounding tubes 6 through which steam or preferably a heat-conducting liquid at elevated temperature is passed. The temperature is so correlated with the mass of the molded article that the rate of heat loss from the center of the piece as the casting cools is less than 100 calories per gram per second, thus holding the casting in the crystallization range long enough to assure crystallinity. After a few seconds (usually less than 120 seconds), the molded piece has hardened sufficiently for removal from the die without distortion, and is ejected therefrom.

By operating in accordance with the method described, the molded piece is crystalline in character, has a heat distortion temperature above 160° C. and generally above 180° C., as determined by the lack of distortion upon heating the piece to 160° C. or even as high as 180° C. for 30 minutes when supported at only two spaced points, and exhibits an Izod impact strength of greater than 0.3 ft. lbs./inch of notch.

Even better resistance to heat distortion is secured if the piece is ejected from the die directly into a hot oil bath having a temperature of 100–150° C. where it is kept for a short time.

Good dimensional stability is also obtained. For instance, a crystalline molded piece prepared as described above, when subjected to a pressure of 9000 p.s.i. for 460 hours, show a sidewise distortion of only about 1/64 of an inch per inch of sample, whereas with conventional amorphous cellulose ester molded products a distortion of 1/8 of an inch or more per inch of sample ordinarily results. The Izod impact strengths of 2½" x ½" x ¼" notched impact molded bars are not less than 0.3 foot pounds per inch of notch thus indicating that the toughness of the molded piece has not been sacrificed when obtaining good resistance to heat distortion. The molded products in accordance with our invention are also highly resistant to scratching.

Heat distortion of molded products is conveniently determined by placing a long molded bar ½ inch wide and ¼ inch thick over a span between two spaced aluminum supports in an oven controlled to give a temperature rise of ½° C. per minute. The bars are inspected visually while heating, and heat distortion is recorded in terms of the temperature at which deformation is observed. The bars are considered distorted and the temperature is taken when the center of the bar had dropped ⅛ inch below its original level. The maximum temperature which could be obtained in the oven was 200° C., hence when distortion had not occurred at 200° C., the distortion temperature is stated as greater than 200° C. (>200° C.).

The following examples illustrate the preparation of products in the form of bars of crystalline structure molded directly from a melt in accordance with the invention.

Example 1

100 parts of cellulose tripropionate prepared by the method described in U.S. Patent 3,047,561, having a hydroxyl content of less than 0.2%, stabilized with 0.025 part of potassium acid oxalate, 0.025 part of strontium naphthenate and 1 part of p-tert.-butyl-phenol and an intrinsic viscosity both before and after heating ½ hour at 250° C. of at least 1.0 was mixed with 1 part of paraffin wax. The composition was compounded in a plastic extruder and formed into rod stock which was granulated in a Cumberland Grinder. The granulated molding composition was injection molded into 2½" x ½" x ¼" notched impact bars and 5" x ½" x ¼" flexural bars in a 2-ounce Watson-Stillman injection molding machine employing the following conditions:

Cylinder temperature—460° F. (256° C.)
Die temperature maintained at 220° F. (122° C.)
Cycle—60 sec.

These bars, when suspended over a 4½ inch span and subjected to a temperature of 200° C., showed no distortion. The Izod impact strength of the notched impact bars was determined at 70° F. (21° C.), to be 0.7 foot pounds per inch of notch.

Example 2

Cellulose propionate butyrate prepared in an esterification procedure in which zinc chloride was used as the catalyst contained 39.1% propionyl, 12.2% butyryl, 1.1% acetyl and 0.1% hydroxyl. 100 parts of this ester stabilized with 0.02 part of potassium acid oxalate, 0.02 part of strontium napthenate and 1.0 part of p-tert.-butyl-phenol, which ester had an intrinsic viscosity of 2.22, a melting point of 238° C., and char point of 273° C. was compounded and granulated as described in Example 1. Bars were molded in a Watson-Stillman injection molding machine employing the following conditions:

Cylinder temperature—500° F. (260° C.)
Injection pressure—350 p.s.i.
Die temperature maintained at—280° F. (139° C.)
Cycle—2 min.

The bars thus obtained had the following characteristics:

Heat distortion temp. no load, 4½ inch span—Greater than 392° F. (200° C.)
Izod impact at 75° F. (24° C.)—0.7 ft. lb./inch. of notch
Flexural strength—7200 p.s.i.

Example 3

Cellulose tripropionate having a hydroxyl content of 0.12% and 0.001% sulfur content was stabilized with .015% potassium acid oxalate, .03% strontium naphthenate and 1% of p-tert.-butyl-phenol. The intrinsic viscosity was 1.78, melting point 245° C. and char point 280° C. 100 parts of the cellulose ester was mixed with 10 parts of dibutyl sebacate in a Phifer Blade mixer and the mass was dried to a powder at 130° C. for two hours in an air circulating oven. The powder, without pelletizing, was extrusion molded in an Ankerwerk screw-type molding machine to form several bars as in Example 1, using the following conditions:

Cylinder—type C with open nozzle.
Temperatures:
    Feed zone—415–430°F. (212–221° C.).
    Plasticizing zone—400–415° F. (204–212° C.)

Nozzle—400–415° F. (204–212° C.)
Die maintained at—215° F. (101° C.)
Cycle—22 secs.
Part molded—¼" x ½" x 5" bar.

Some of the bars were placed in an oil bath at 140° C. and annealed for twenty minutes after removal from the die.

The physical properties of the bars were determined as follows:

|  | Bars as molded | Bars annealed at 140° C. after molding |
|---|---|---|
| Unnotched impact strength, ft. lb./in. face | 5.2 | 3.2 |
| Flexural strength, p.s.i. | 4,800 | 4,900 |
| Heat distortion: |  |  |
| No load (° C.) | >160 | >160 |
| Under 66 p.s.i. load: |  |  |
| 1/64" deflection (° C.) | 88 | 120 |
| ¼" deflection (° C.) | 204 | 205 |

Example 4

Cellulose tripropionate containing 0.01 hydroxyl group per anhydroglucose unit and an intrinsic viscosity greater than 1 was plasticized with 13 parts of triethylene glycol di(2-ethyl hexoate) and the composition was compounded and pelletized as previously described. The composition was melted by heating to 415° F. (212° C.) and injection molded into a mold maintained at 230° F. (111° C.) to form a bar 2.5" x 0.5" x 0.25". A superior distortion temperature of 205° C. was obtained, and X-ray examination showed good crystallinity.

The molding operation was repeated but an unheated mold was used. The 2.5" x 0.5" x 0.25" bar obtained had a heat distortion temperature of only 98° C. It showed no crystallinity when examined by X-ray.

Example 5

100 parts of cellulose acetate propionate having 26% acetyl and 21.4% propionyl contents, an intrinsic viscosity of 2.01 and 0.09% hydroxyl content, stabilized with 0.02 part of strontium naphthenate, 0.02 part of potassium acid oxalate and 1.5 parts of p-tert.-butyl-phenol was compounded with 25 parts of diisobutyl phthalate to form a molding composition which was pelletized. The composition was heated to 500° F. (260° C.) and injected into a mold maintained at 250° F. (121° C.), using a two minute cycle, to form a 6" x ½" x ¼" bar. It exhibited the following physical properties:

Izod impact strength—1.2 ft. lbs./in. of notch
Heat distortion temperature (no load)—175° C.
Submerged in boiling water without distortion—8 hours

DIRECT MOLDING OF ARTICLES FROM MELT FOLLOWED BY REHEATING TO CRYSTALLIZE

Example 6

A cellulose tripropionate ester having 0.09% hydroxyls per anhydroglucose unit was stabilized with 0.015% $KHC_2O_4$, 0.02% strontium naphthenate and 1.0% p-tert.-butyl-phenol so as to have an intrinsic viscosity of 1.76. This composition was mixed with 5% di-butyl sebacate and then dried overnight in a 120° C. air circulating oven.

A one-inch I.D. pipe having a wall thickness of 100 mils was molded by extrusion through a die. This pipe was connected to a 30 p.s.i. steam line and operated for one day at a temperature of approximately 135° C. sufficient to crystallize the ester. At the end of the test the pipe showed no distortion or other adverse effects.

MOLDING OF SHEETS

We have also found that crystalline structures may be prepared from amorphous sheets of the specific types of cellulose esters described above by heating the sheet above the softening point range and above the spontaneous crystallization temperaure range thereof until it is flowable, and forcing the sheet against the surface of a mold as a lining therefor. This is conveniently done by creating a gas pressure differential between the top and bottom of the sheet, as by evacuating the air from between the mold and the sheet while concurrently and continuously heating the mold and sheet. Positive gas pressure above the sheet also may be employed; and a plunger may be used in conjunction with a vacuum, or even independently to mold the sheet. The formed object is then ejected from the mold and has better resistance to heat distortion than has been obtainable heretofore, as well as good transparency without significant haze.

The amorphous sheets which are useful for vacuum forming in accordance with our invention should contain 70% cellulose ester, or more. In general, the plasticizers conventionally used with a particular cellulose ester will produce satisfactory results. These plasticizers may be incorporated in amounts of 0 to 40 parts of plasticizer per 100 parts cellulose ester to give the desired results. For example, diisobutylazelate and dibutylphthalate are useful in plasticizing cellulose acetate propionate. Although we prefer to use no plasticizer with cellulose tripropionate or tributyrate, dibutylsebacate, diisobutylazelate or butylstearate may be employed if desired. Diisobutylphalate and dibutylphthalate are useful plasticizers when cellulose acetate butyrate (acetyl being no more than 5% of total acyl) is employed as the cellulose ester.

A useful method of formulating the desired composition involves extruding the material from a die into the form of a sheet at a temperature above the crystalline melting point thereof, and reducing the temperature of the sheet (for example, by the use of a quenching bath) to below the recrystallization temperature range within 30 seconds, and preferably within 5 seconds, after the composition is extruded.

When it is necessary to store the sheet after extrusion but before vacuum forming, storage is preferably at a temperature below the crystallizing temperature range.

In carrying out our invention, it is desirable to determine the following temperature points or ranges of the particular composition employed: the crystalline melting point, the recrystallization temperature range, the softening point range, and the spontaneous crystallization temperature. These values may be advantageously determined by differential thermal analysis. This analytical technique is described by Smothers and Chiang in "Differential Thermal Analysis," published by the Chemical Publishing Company, New York, 1958.

Figure 2:
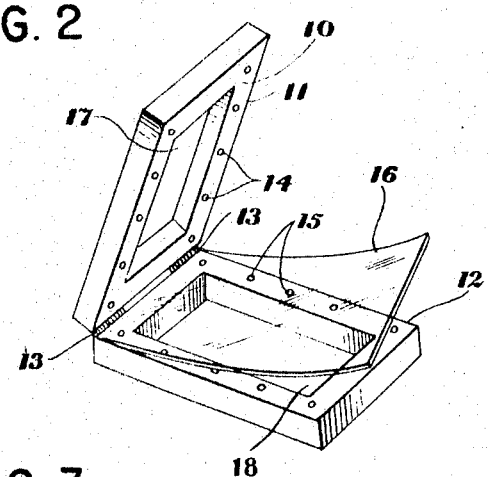
FIG. 2 is a perspective view showing a clamping frame for clamping a thin sheet to be vacuum molded.

Referring to FIG. 2, there is shown a sheet clamping frame 10 comprising rectangular frame members 11 and 12 which are hinged at 13. The frames are in register and pins 14 on the upper frame member 11 fit into holes 15 in the lower frame member 12 when in clamping or closed position. An amorphous cellulose ester sheet 16 is shown between members 11 and 12 and in position to be clamped thereby. The rectangular spaces 17 and 18 which are defined respectively by frame members 11 and 12 are also in register when the frame clamp 10 is in clamping position as shown in FIG. 2.

Figure 3:
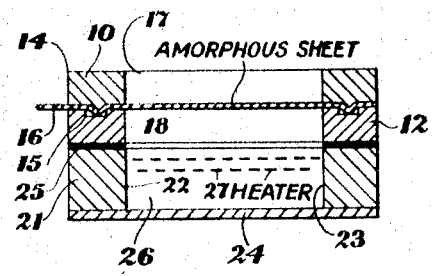
FIG. 3 is a vertical sectional view showing an electrical preheating unit carrying the frame and sheet of FIG. 2.

Referring to FIG. 3, there is shown a heating unit 21 having a rectangular boxlike shape generally corresponding in size to clamping frame 10. The sidewalls of the heating unit 21 are shown at 22 and 23 and the bottom at 24. The upper flat surfaces of the sidewalls and end walls, not shown, are covered by a heat resistant layer 25 such as sheetrock. The box 21 may be made of sheetrock or other heat resisting material. In the hollow space 26 within the box are positioned electrical heating elements 27. The clamped sheet is positioned above the heating unit 21 as shown in the drawing with space 18 in register with space 26. Heat is thus applied to sheet 16 until it reaches a temperature above the softening point range but below the spontaneous crystallization temperature range thereof.

Figure 4:
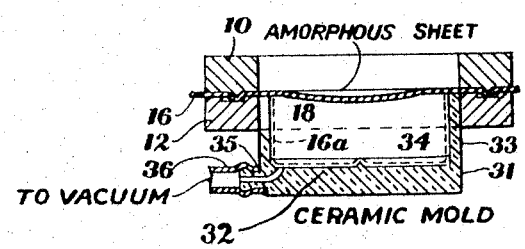
FIG. 4 is a vertical sectional view showing a cup-shaped vacuum mold carrying the clamping frame and sheet of FIG. 2 in position for vacuum molding.

The operator then quickly transfers the framed sheet 16 to the position shown in FIG. 4. As shown in FIG. 4, the framed sheet is placed over the space 34 of a rectangular box-shaped vacuum mold 31 comprising a bottom 32, sidewalls 33 and end walls. A conduit 35 through the wall of mold 31 is connected to a vacuum pump by hose 36. As soon as the sheet 16 covers the mold, the vacuum line is opened and the sheet is drawn into the cup-shaped mold 31 as shown at 16a, being forced against the surface of the mold as a lining therefor.

Heating of the sheet and mold during forming has been accomplished by maintaining the mold and framed sheet in an oven at the desired temperature. Success has also been obtained by heating the mold and sheet by an infrared lamp positioned above.

The temperature of the mold and the sheet during and after forming is concurrently and continuously maintained between 149° C. and the crystalline melting point of the sheet 16 for a time long enough to harden the sheet sufficiently to permit ejection from the mold. An upper limit of 220° C. is practical for inducing crystallization without approaching the melting point too closely. In some instances, the time consumed in forming the article may be sufficient to give the desired effect; in other instances, the article is held in the mold a few seconds. The molded article is then ejected from the mold.

By vacuum forming the amorphous cellulose ester sheeting in accordance with the method described, a structure is obtained having good crystalline characteristics and heat distortion temperatures above 200° C.

Sheets up to one-half inch thick can be processed successfully using the principles of the invention.

Our invention will be further illustrated by the following examples.

Example 7

Cellulose tripropionate prepared in an esterification procedure in which zinc chloride was used as a catalyst contained an average of 0.11% total hydroxyl and had a viscosity in methylene chloride-methyl alcohol solution (9:1) of 2.19. 100 parts of this ester was stabilized with 0.02 part of potassium acid oxalate, 0.02 part of strontium naphthenate and 1.0 part of p-tertiary-butylphenol. The ester had a melting point of 245° C. and a char point of 292° C. 100 parts of this ester was mixed with one part paraffin wax and 15 parts diisobutylphthalate. The composition was compounded in a plastic extruder and formed into rod stock which was granulated in a Cumberland Grinder. The composition was then extruded into a 38 mil thick sheet at 240° C. (a temperature above the crystalline melting point of the composition), and into a 10° C. water bath with the water level maintained four inches below the face of the die lips. The sheeting remained in the water bath for at least three minutes after extrusion in order to quench the sheet at a temperature below the recrystallization temperature of the composition.

The amorphous sheet thus prepared was placed in a frame and placed over a cavity at an oven temperature of 160° C. The cavity was evacuated, thus drawing the sheet into the mold to form a cup. The temperature of the mold and cup was maintained at 160° C. until the sheet hardened, whereupon the cup was ejected from the mold.

The heat distortion of the cup was tested by placing it in an oven controlled to give a temperature rise of one-half degree C. per minute. The cup was inspected visually while heating and the heat distortion was recorded in terms of the temperature at which first deformation was observed. The maximum temperature which could be obtained in the oven used was 200° C. The cup showed no heat distortion at the maximum temperature of the oven.

Example 8

100 parts of cellulose tripropionate was prepared in accordance with the method described in U.S. Patent 3,047,561 having a percent total hydroxyl of 0.12. The cellulose ester was stabilized with 0.025 part of potassium acid oxalate, 0.025 part strontium naphthenate and 1 part p-tertiary-butylphenol. The composition had an intrinsic viscosity in methylene chloridemethyl alcohol (9:1) of 1.62. The composition was mixed with one part paraffin wax and 15 parts diisobutylphthalate, compounded and extruded at 240° C. in the manner described in Example 7. The 38 mil sheet obtained was heated to 160° C. and was vacuum formed as a cup in the same manner as in Example 7. The mold and cup were then heated in the oven to 200° C., which temperature was maintained for approximately 5 minutes whereupon the cup had hardened. The cup was found to have a heat distortion temperature above 200° C.

Example 9

Cellulose acetate propionate was prepared by the method of U.S. Patent 3,047,561, having an acetyl content of 19.1, a propionyl content of 29.5, 0.06% hydroxyl content, a melting point of 247° C., a char point of 285° C., and a viscosity of 2.15 in a 9:1 solution of methylene chloridemethyl alcohol after stabilization in the manner described in Example 7. 100 parts of this ester was mixed with 10 parts diisobutylazelate and the composition was pressed into a 38 mil thick sheet with an electric press at 250° C. and quenched in a water bath at 10° C. The amorphous sheet thus obtained was heated to 180° C. and vacuum formed into a cup in the manner described in Example 7. After heat setting for 5 minutes, the hardened cup was ejected and found to have a heat distortion temperature above 200° C.

Example 10

An unplasticized cellulose ester containing 48% propionyl, 2.2% acetyl and .3% hydroxyl was extruded into a sheet and quenched in the manner described in Example 7. The sheet was cut into squares which were clamped in a frame, placed over a mold and preheated at various temperatures for different lengths of time. After the preheat period, the sheets were vacuum formed, heat set and hardened at various temperatures and time periods and ejected from the mold. All the samples which were heated to hardness at a temperature above 149° C. failed to show any visual distortion at 200° C.

Example 11

Cellulose acetate propionate prepared with zinc chloride catalyst had an acetyl content of 23.7% and a propionyl content of 24.3%, a hydroxyl content of 0.11%, a melting point of 257° C., and a char point of 280° C. 100 parts of this ester was stabilized, mixed with 25 parts diisobutylphthalate, compounded and extruded at 250° C. into a 38 mil sheet in the maner described in Example 7. The amorphous sheet thus obtained was clamped in a frame and placed over the mold in an oven heated to 175° C. The sheet was vacuum formed and heat set for approximately 5 minutes whereupon it had hardened. A producet resistant to distortion by heat resulted.

Example 12

Cellulose tripropionate sheeting was clamping in a frame, placed in an oven at 155° C. for one minute, then placed over the mold cavity in the oven and the cavity was evacuated. The resulting cup was heat set at 160° C. for 15 minutes whereupon it hardened. The hardened cup was then ejected from the mold, and was found to have a heat distortion temperature above 200° C.

Example 13

A cellulose tripropionate composition having 0.10% hydroxyls per anhydroglucose unit stabilized with 0.015%

$KHC_2O_4$, 0.02% strontium naphthenate and 1.0% p-tert.-butyl-phenol and an intrinsic viscosity of 1.68 was formed into a 38 mil sheet. The sheet was preheated below the second order transition temperature until sufficiently flexible for vacuum forming.

The sheet was vacuum formed while concurrently and continuously heating at about 149° C. into cups one inch deep and 2⅜ inches in diameter. The cups hardened sufficiently after approximately thirty seconds and were then ejected.

Several of these cups were filled with water and placed in a freezer maintained at −30° C. for one week. After this time period the cups containing ice were removed from the freezer and immediately placed on an electric heater maintained at 135° C. for a time sufficient to melt the ice and evaporate the water. None of the cups was distorted or damaged.

Several other cups were filled with a baking mix and subjected to baking conditions of 177° C. for forty minutes in an oven. None of the cups was distorted.

Example 14

Amorphous 38 mil unplasticized cellulose tripropionate sheets containing 0.1% hydroxyl, and prepared by the process of Patent 3,047,561, were preheated 8–10 seconds at 138–149° C. and then were vacuum formed into cups one inch deep and 2⅜ inches across, in the manner described in connection with FIGS. 2–4. The mold, and the sheets when in place, were heated at different temperatures by an infrared lamp three inches above the bottom of the mold.

Similar cellulose tripropionate sheets containing 0.14% hydroxyl and plasticized with 10 parts of dibutyl sebacate per 100 parts ester were molded in the same way, with preheating of 6–8 seconds at 127–138° C.

To determine the forming temperature at which recrystallization occurred, the cups were placed in an oven at 190–200° C. and checked for distortion after 5 minutes. The cups which were formed at temperatures up to 132° C. distorted, indicating recrystallization did not occur. Those formed at temperatures of 149° C. and higher did not distort, indicating that recrystallization had occurred.

Table I below lists the results:

TABLE I

| Mold temp., ° C. | Time in mold, seconds | Distortion |
| --- | --- | --- |
| Plasticized sheets: | | |
| 27 | 30 | Yes. |
| 54 | 30 | Yes. |
| 63 | 30 | Yes. |
| 71 | 30 | Yes. |
| 79 | 30 | Yes. |
| 93 | 30 | Yes. |
| 99 | 30 | Yes. |
| 110 | 30 | Yes. |
| 121 | 30 | Yes. |
| 127 | 30 | Yes. |
| 132 | 30 | Yes. |
| 149 | 30 | No. |
| 149–160 | 30 | No. |
| 154–160 | 15 | No. |
| 166 | 30 | No. |
| 166–177 | 30 | No. |
| 177 | 30 | No. |
| Unplasticized sheets: | | |
| 27 | 20 | Yes. |
| 93 | 30 | Yes. |
| 121 | 30 | Yes. |
| 129 | 60 | Yes. |
| 149 | 60 | No. |
| 149 | 30 | No. |
| 154 | 30 | No. |
| 166 | 30 | No. |
| 160–177 | 30 | No. |

The effect of preheat time on vacuum forming and recrystallization was also investigated for the cellulose acetate material of Example 14. It was found that, as the preheating time increased from the minimum time in which an acceptable cup was formed, a time was reached when the sheet partially crystallized. Only a partially formed cup was obtained from such overheated sheets when molded at about 149° C. without any holding time in the mold, and crystallization was further shown by the lack of distortion when the partially formed cups were heated in an oven at 190–200° C. for five minutes.

The minimum acceptable preheat time for plasticized esters was 20 seconds, and the maximum was a little less than 50 seconds; for unplasticized esters, 25 seconds and a little less than 60 seconds.

The cellulose ester compositions of the present invention may be used to manufacture a wide variety of thermoplastic articles. However, they offer the greatest advantages in products which are subjected during use to wide temperature ranges. These advantages arise, of course, from the unusual capability of these molded products to resist distortion due to thermal effects. These products include items such as baking dishes, ice trays, egg trays, cups, laboratory equipment, refrigerator receptacles, freeze and cook containers, phonograph records, high and low temperature pipes, insulation for electrical wiring, surgical and hygienical items which are subjected to sterilization by heating, certain optical items which may be subjected to wide temperature ranges, automobile light lenses, and many other products in which thermal distortion is undesirable.

An important advantage of the invention is its rapidity as evidenced by successful molding of cups in only a few seconds in most of the examples. The longer molding periods of 5 to 15 minutes in Examples 9, 11 and 12 were used in the early work before it was discovered that a period of only a few seconds, such as 15 to 60 seconds, is adequate.

We claim:
1. A method of producing cellulose ester structures having high heat distortion temperatures which comprises
   (a) providing a flowable mass of crystallizable cellulose ester material comprising a cellulose ester, of which at least ⅓ of the combined acyl is made up of radicals of 3 to 4 carbon atom fatty acids, in which 95% of the total acyl radicals differ from each other by no more than 1 carbon atom, a hydroxyl content of no more than 0.6% and an intrinsic viscosity greater than 1 in methylene chloride-methyl alcohol (9:1) even when the ester has been heated for one-half hour at 250° C., and
   (b) shaping said cellulose ester material while concurrently and continuously holding the cellulose ester material at a temperature above the crystallization temperature but below the crystalline melting point for a sufficient length of time to induce crystallinity and harden the shaped article.

2. A method in accordance with claim 1 wherein said material is shaped by introducing it into a heated mold and causing it to assume the shape of said mold; permitting said article to harden in said mold; and then ejecting said shaped article from said mold.

3. A method in accordance with claim 2 comprising the additional step of introducing the molded article, after ejection, into a liquid bath at a temperature of 100 to 150° C. to improve the characteristics thereof.

4. A method in accordance with claim 2 wherein said article is molded by injecting a melted slug of cellulose material into a mold to fill the interior thereof.

5. A method in accordance with claim 2 wherein said article is molded by injecting a melted slug of said amorphous cellulose ester material into a mold to fill the interior thereof, and the temperature is maintained between 82 and 182° C., and the heat transferral rate from the center of said article is less than 100 calories per gram per second.

6. A method in accordance with claim 1 wherein said article is extruded to shape and then heated to induce crystallinity.

7. A method in accordance with claim 2 wherein said flowable mass of cellulose ester is provided as an amorphous sheet and is forced against the surface of said mold as a lining therefor, and wherein the temperature is maintained at least at 149° C.

8. A method in accordance with claim 7 wherein said ester is cellulose tripropionate.

9. A method in accordance with claim 7 wherein said sheet is forced into a hollow mold by differential gas pressure, and said mold is heated concurrently and continuously during the forming operation.

10. A method in accordance with claim 2 wherein said shaped article is ejected after less than 120 seconds in said mold.

11. An article comprising a crystalline cellulose ester of which at least ⅓ of the combined acyl is made up of radicals of 3 to 4 carbon atom fatty acids, in which 95% of the total acyl radicals differ from each other by no more than 1 carbon atom, having a hydroxyl content of no more than 0.6% and an intrinsic viscosity greater than 1 in methylene chloride-methyl alcohol (9:1) even when the ester has been heated for one-half hour at 250° C., wherein said article is characterized by freedom from distortion when heated for 30 minutes at 160° C.

12. An article in accordance with claim 11 characterized by an Izod impact strength greater than 0.3 ft. lbs./inch of notch.

13. An article in accordance with claim 11 of material molded in the shape of a cup from a sheet, and having a heat distortion temperature above 160° C.

14. An article in accordance with claim 11 wherein said cellulose ester is cellulose tripropionate.

15. An article in accordance with claim 11, vacuum formed from a cellulose ester thermoplastic sheet or film which does not distort when reheated to temperatures higher than the temperature at which the article was vacuum formed.

References Cited

UNITED STATES PATENTS

| 2,320,112 | 5/1943 | Wiley | 264—291 |
| 2,372,630 | 3/1945 | Smith | 264—329 |
| 2,660,761 | 12/1953 | Peters | 156—160 |

FOREIGN PATENTS 231,090  11/1958  Australia.

Ott et al.: Cellulose and Cellulose Derivatives, Part I, New York, Interscience Publishers, Inc., 1954, pp. 340–44.

ROBERT F. WHITE, Primary Examiner

JEFFERY R. THURLOW, Assistant Examiner

U.S. Cl. X.R.

260—230; 264—92, 235, 328, 331, 346